United States Patent
Nishikawa et al.

(10) Patent No.: US 7,578,761 B2
(45) Date of Patent: Aug. 25, 2009

(54) HYDRAULIC CIRCUIT CONTROL DEVICE

(75) Inventors: Ryo Nishikawa, Shioya-gun (JP); Takashi Aoki, Saitama (JP); Masashi Tanaka, Utsunomiya (JP); Nobuhiro Kira, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 692 days.

(21) Appl. No.: 11/391,274

(22) Filed: Mar. 29, 2006

(65) Prior Publication Data
US 2006/0223670 A1    Oct. 5, 2006

(30) Foreign Application Priority Data
Mar. 31, 2005  (JP)  ............................ P2005-102507
Nov. 22, 2005  (JP)  ........................... P 2005-336782

(51) Int. Cl.
*F16H 31/00*    (2006.01)
(52) U.S. Cl. .......................... 475/127; 475/5; 475/116; 475/136; 475/159; 477/129; 477/160; 477/164
(58) Field of Classification Search .................... 475/5, 475/116, 127, 129, 132, 136, 159, 160; 477/129, 477/158, 160, 163, 164, 168, 180
See application file for complete search history.

(56) References Cited

U.S. PATENT DOCUMENTS 5,839,084 A * 11/1998 Takasaki et al. ............... 701/67
6,565,473 B2 * 5/2003 Endo et al. ................... 475/117

FOREIGN PATENT DOCUMENTS

JP   2003-054279 A   2/2003

* cited by examiner

*Primary Examiner*—David D. Le
(74) *Attorney, Agent, or Firm*—Arent Fox LLP (57) ABSTRACT

A hydraulic circuit control device that selectively supplies oil to a first oil passage and a second oil passage by an oil pump, the control device includes: an oil passage switching unit adapted to connect the oil pump to either the first oil passage or the second oil passage; a control mode switching unit adapted to switch the control mode of the electric motor to either a torque control mode or a speed control mode; an oil passage selecting unit adapted to select whether to connect the oil pump to the first oil passage or the second oil passage; and a control unit adapted to perform control so that the control mode switching unit switches the control mode to the torque control mode when the first oil passage has been selected, and perform control so that the control mode switching unit switches the control mode to the speed control mode when the second oil passage has been selected.

7 Claims, 11 Drawing Sheets

HYDRAULIC CIRCUIT CONTROL DEVICE

BACKGROUND OF THE INVENTION

1. Field of the Invention

The present invention relates to a hydraulic circuit control device that selectively supplies oil to two oil passages with an oil pump.

Priority is claimed on Japanese Patent Application No. 2005-102507, filed Mar. 31, 2005, and Japanese Patent Application No. 2005-336782, filed Nov. 22, 2005, the contents of which are incorporated herein by reference.

2. Description of Related Art

A vehicle drive system has been developed in which either the front or rear wheels are powered by a main drive source such as an internal combustion engine, while an auxiliary drive source is provided by an electric motor for the other wheels.

Under normal driving conditions in a vehicle equipped with such a drive system, the main drive source drives the front or rear wheels, while the auxiliary drive source is activated to transmit drive power to the other wheels when, for example, setting off in adverse road conditions. In such a vehicle, a hydraulic engaging/disengaging device such as a hydraulic clutch is provided in the power transmission mechanism to deliver power from the driving electric motor serving as the auxiliary drive source, with such a clutch being suitably controllable in accordance with the vehicle running state. For example, at times when driving or regeneration of the electric motor is not required, by using the clutch to cut off power transmission with the electric motor, drive power loss arising from co-rotation of the electric motor can be reduced.

A control unit for a hydraulic actuator resembling the engaging/disengaging device described above has been proposed that provides an accumulator in the oil passage leading to the actuator to reduce the power loss of the oil pump (see, for example, Japanese Unexamined Patent Application, Publication No. 2003-54279).

In this control unit for an actuator, the accumulator is installed in the oil passage on the actuator side, and a check valve that only allows inflow of oil to the actuator side is interposed between the oil pump and the actuator, with the oil pump operating only when the pressure in the accumulator falls.

In the aforementioned control unit, the oil supplied from the oil pump is supplied only to the oil passage on the actuator side, which requires a high pressure. However, there is a clear need for shared use of the same oil pump for oil passages that require a low pressure and a high flow rate for lubrication and the like.

One solution that has been studied is to provide in the oil pump supply passage an oil passage switching valve that switches connection between the oil passage that requires a high pressure and the oil passage that requires a low pressure and a high flow rate, and operate the oil passage switching valve in accordance with requirements on the system side. In this case, it would be necessary to control the pump driving electric motor that drives the oil pump simultaneously with switching the oil passages in order to adjust the oil being supplied to a suitable oil pressure and flow rate.

However, in the case of always using speed control to control the pump driving electric motor, sudden fluctuations in the hydraulic load when used for the oil passage that requires a high pressure may cause step out of the electric motor.

Controlling the pump driving motor by torque control has also been investigated, but in this case, overspeed of the electric motor occurs when used for the oil passage that requires a low pressure and a high flow rate, leading to high power consumption, which is not desirable from the standpoint of energy conservation.

SUMMARY OF THE INVENTION

The present invention has as its object providing a control unit for a hydraulic circuit that can effectively use a common oil pump for an oil passage that requires a high pressure and an oil passage that requires a low pressure and high flow rate without causing problems such as step out and increased power consumption of the pump driving electric motor.

In order to attain the aforementioned object, the present invention provides a hydraulic circuit control device that selectively supplies oil to a first oil passage that requires a high pressure and a second oil passage that requires a low pressure and high flow rate by an oil pump driven by an electric motor, the control device including: an oil passage switching unit adapted to connect the oil pump to either the first oil passage or the second oil passage; a control mode switching unit adapted to switch the control mode of the electric motor to either a torque control mode or a speed control mode; an oil passage selecting unit adapted to select whether to connect the oil pump to the first oil passage or the second oil passage; and a control unit adapted to perform control so that the control mode switching unit switches the control mode of the electric motor to the torque control mode when the oil passage selecting unit has selected the first oil passage, and to perform control so that the control mode switching unit switches the control mode of the electric motor to the speed control mode when the oil passage selecting unit has selected the second oil passage.

In the present invention, when the oil passage selecting unit selects whether to supply oil to the first oil passage or the second oil passage, in accordance with that selection result, the oil passage switching unit and the control mode switching unit are separately controlled by the control unit. By means of the control performed by the control unit, when the oil pump is to be connected to the first oil passage that requires a high pressure, the pump driving electric motor is controlled in the torque control mode, and when the oil pump is to be connected to the second oil passage that requires a low pressure and high flow rate, the pump driving electric motor is controlled in the speed control mode.

The oil passage selecting unit may be adapted to perform oil passage selection based on at least one of a pressure of the first oil passage and a flow rate of the second oil passage.

In this case, when, for example, selecting the oil passage based on the pressure of the first oil passage, the pressure of the first oil passage is monitored so that when the pressure deviates from the set pressure condition, the first oil passage is chosen as the oil passage to connect to the oil pump. Thereby, oil supply is always provided in accordance with the requirements of the first oil passage side. Similarly, when selecting the oil passage based on the flow rate of the second oil passage, the flow rate of the second oil passage is monitored so that when the flow rate deviates from the set flow rate condition, the second oil passage is chosen as the oil passage to connect to the oil pump. Thereby, oil supply is always provided in accordance with the requirements of the second oil passage side.

The present invention provides a hydraulic circuit control device mounted in a drive device of a vehicle including wheels; a first electric motor that has a coil and a cooling portion and drives the wheels; a power transmission device that has a lubricating portion and transmits the drive power of the first electric motor to the wheels; and a hydraulic clutch mounted in the power transmission device that performs engagement and disengagement of drive power between the first electric motor and the wheels, the control device including: a first oil passage that requires a high pressure and is connected to the hydraulic clutch; a second oil passage that requires a low pressure and high flow rate and is connected to at least one of the cooling portion and the lubricating portion; an oil pump that is driven by a second electric motor and that selectively supplies oil to the first oil passage and the second oil passage; an oil passage switching unit adapted to switch the connection of the oil pump to either the first oil passage or the second oil passage; a control mode switching unit adapted to switch the control mode of the second electric motor to either a torque control mode or a speed control mode; an oil passage selecting unit adapted to select whether to connect the oil pump to either the first oil passage or the second oil passage; and a control unit adapted to perform control so that the control mode switching unit switches the control mode of the second electric motor to the torque control mode when the oil passage selecting unit has selected the first oil passage, and to perform control so that the control mode switching unit switches the control mode of the second electric motor to the speed control mode when the oil passage selecting unit has selected the second oil passage.

When the hydraulic clutch is performing an engagement or disengagement operation, large fluctuations in the hydraulic load occur. However, when supplying oil to the clutch side, since the second electric motor is controlled in the torque control mode, the second electric motor is hardly affected by the hydraulic load. When supplying oil to the cooling portion of the first electric motor or the lubricating portion of the power transmission system, since the second electric motor is controlled in the speed control mode, overspeed of the second electric motor is prevented.

The hydraulic circuit control device of the present invention may further include a drain passage connected to the second oil passage, and a relief valve adapted to discharge oil in the second oil passage to the drain passage when a pressure of the second oil passage is equal to or greater than a first predetermined value.

In this case, when the viscosity of the oil increases at low temperatures, causing the pressure in the second oil passage to be equal to or greater than the first predetermined value, the relief valve discharges the oil in the second oil passage to the drain passage. Because of this, when the second electric motor is operating in speed control mode, an excessive load caused by the change in viscosity of the oil no longer acts on the second electric motor. Therefore, the energy efficiency of the second electric motor can be raised and step loss can be prevented in the second electric motor that is speed controlled.

In the hydraulic circuit control device of the present invention, the second oil passage may have an upstream portion and a downstream portion that has a cooling oil passage that connects to the cooling portion and a lubricating oil passage that connects to the lubricating portion, with an orifice provided in the lubricating oil passage, and a pressure regulating valve provided in the cooling oil passage and adapted to make oil flow into the cooling portion when the pressure of the upstream portion is equal to or greater than a second predetermined value.

In this case, when oil discharged from the oil pump is supplied to the second oil passage side, a pressure differential occurs upstream and downstream the orifice in the lubricating oil passage, so that the pressure gradually rises at the side of the branch portion before the orifice. When the pressure at the branch portion side rises to be equal to or greater than the second predetermined value, the pressure regulating valve opens. Oil then is supplied from the branch portion side to the cooling portion of the first electric motor, and the pressure of the oil supplied to the lubricating portion is limited to lower than the second predetermined value.

The hydraulic circuit control device of the present invention may further include a spray unit provided in the cooling portion, being adapted to discharge oil introduced through the cooling oil passage onto the coil.

In this case, when oil is supplied to the cooling oil passage, the oil is directly sprayed onto the coil of the first electric motor via a spray mechanism. Accordingly, oil uniformly and forcefully falls on the entire coil of the first electric motor, with the sprayed oil penetrating to the interior so that the entire coil can be efficiently cooled by the oil.

The relief valve and the pressure regulating valve may be integrally formed.

In this case, when the pressure at the branch portion side rises to the second predetermined value as oil discharged from the oil pump is supplied to the second oil passage side, the valve body opens the cooling oil passage to supply oil to the cooling portion of the first electric motor, with the supply pressure on the lubricating oil passage side then decreasing. When the pressure at the branch portion side rises to be equal to or greater than the first predetermined value, the valve body opens the drain passage to discharge oil in the second oil passage, and so thereby the pressure in the second oil passage is held lower than the first predetermined value. Accordingly, limiting the pressure of the lubricating oil passage under ordinary use conditions and relief of the oil when the oil viscosity rises can be performed by a single valve body. This can lower manufacturing costs and reduce the weight and size of the apparatus.

According to this invention, when supplying oil to the first oil passage that requires a high pressure, the second electric motor is controlled in the torque control mode, and when oil is supplied to the second oil passage that requires a low pressure and high flow rate, the second electric motor is controlled in a speed control mode. Therefore, a common oil pump can be effectively used without causing problems such as step out of the second electric motor and increased power consumption of the second electric motor.

DETAILED DESCRIPTION OF THE INVENTION

The embodiment of the present invention is described below with reference to the accompanying drawings. This embodiment applies the hydraulic circuit control device according to the present invention to a hydraulic system provided in a drive device 1 for auxiliary drive use in a vehicle 3 shown in FIG. 2.

Figure 2:
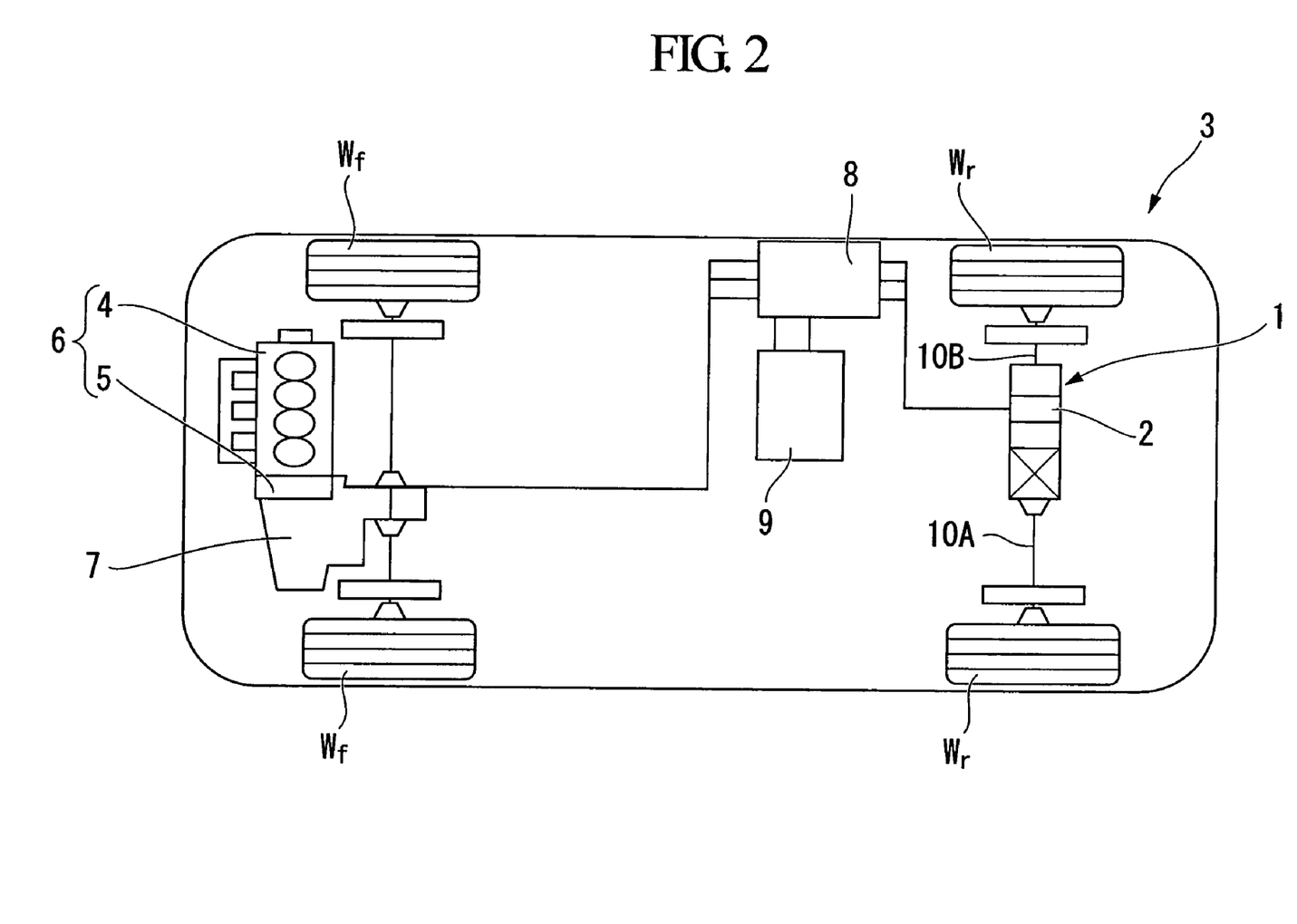
FIG. 2 is a schematic outline view of the vehicle in which the embodiment is implemented.
Figure 3:
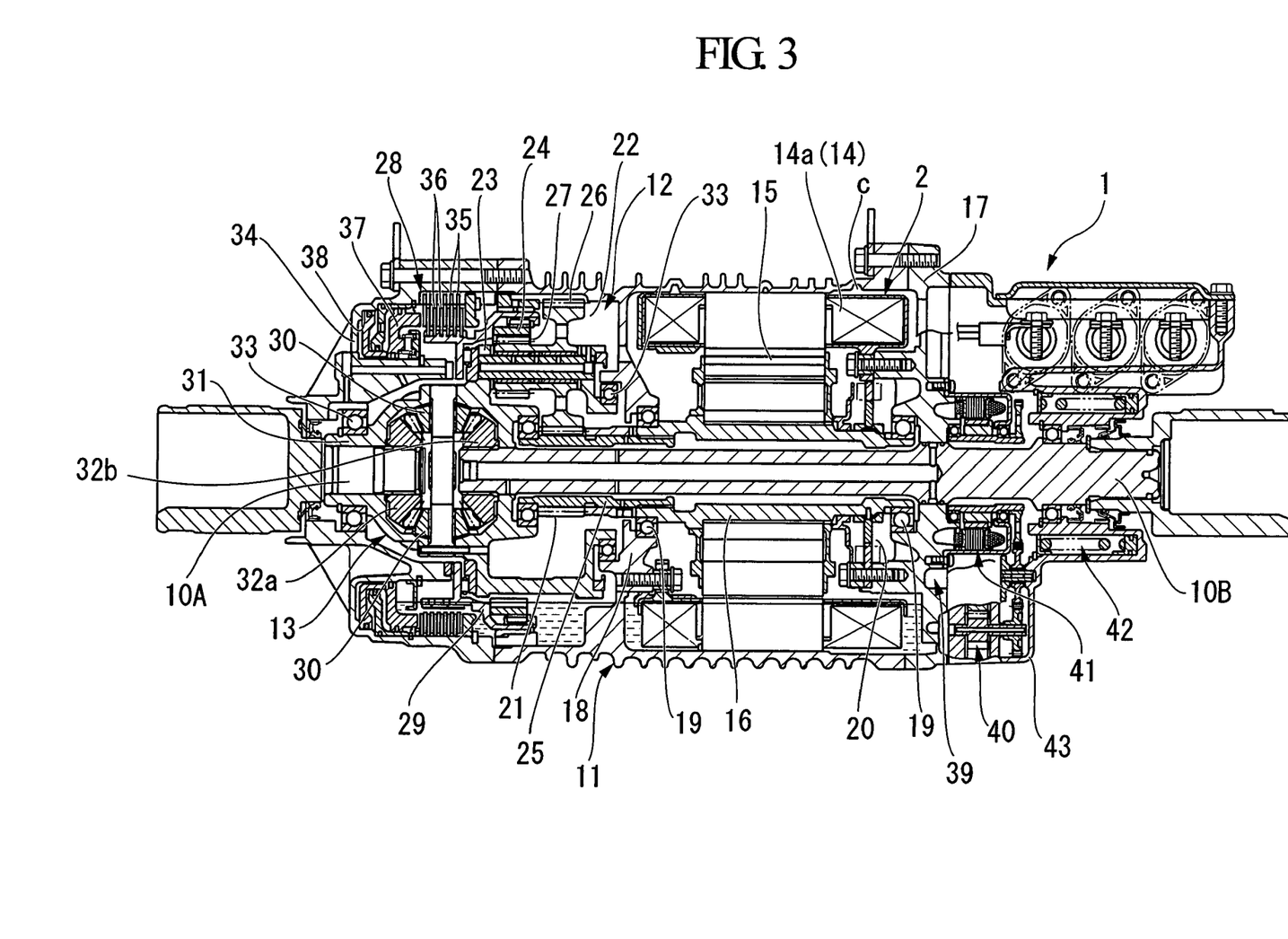
FIG. 3 is a longitudinal sectional view of the driving system employing the pump driving electric motor in FIG. 2.
Figure 4:
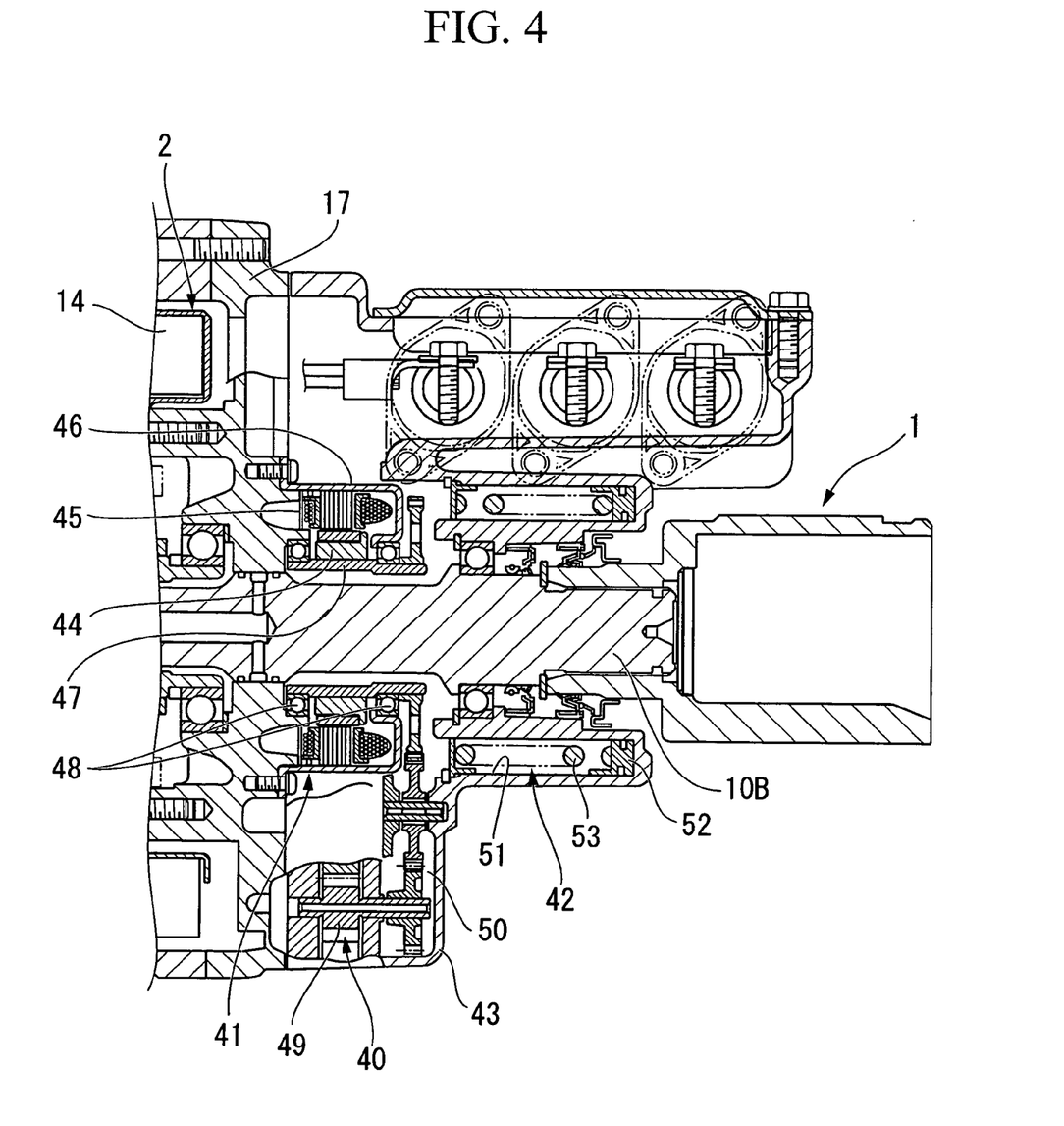
FIG. 4 is an enlarged sectional view of a portion of FIG. 3.
Figure 5:
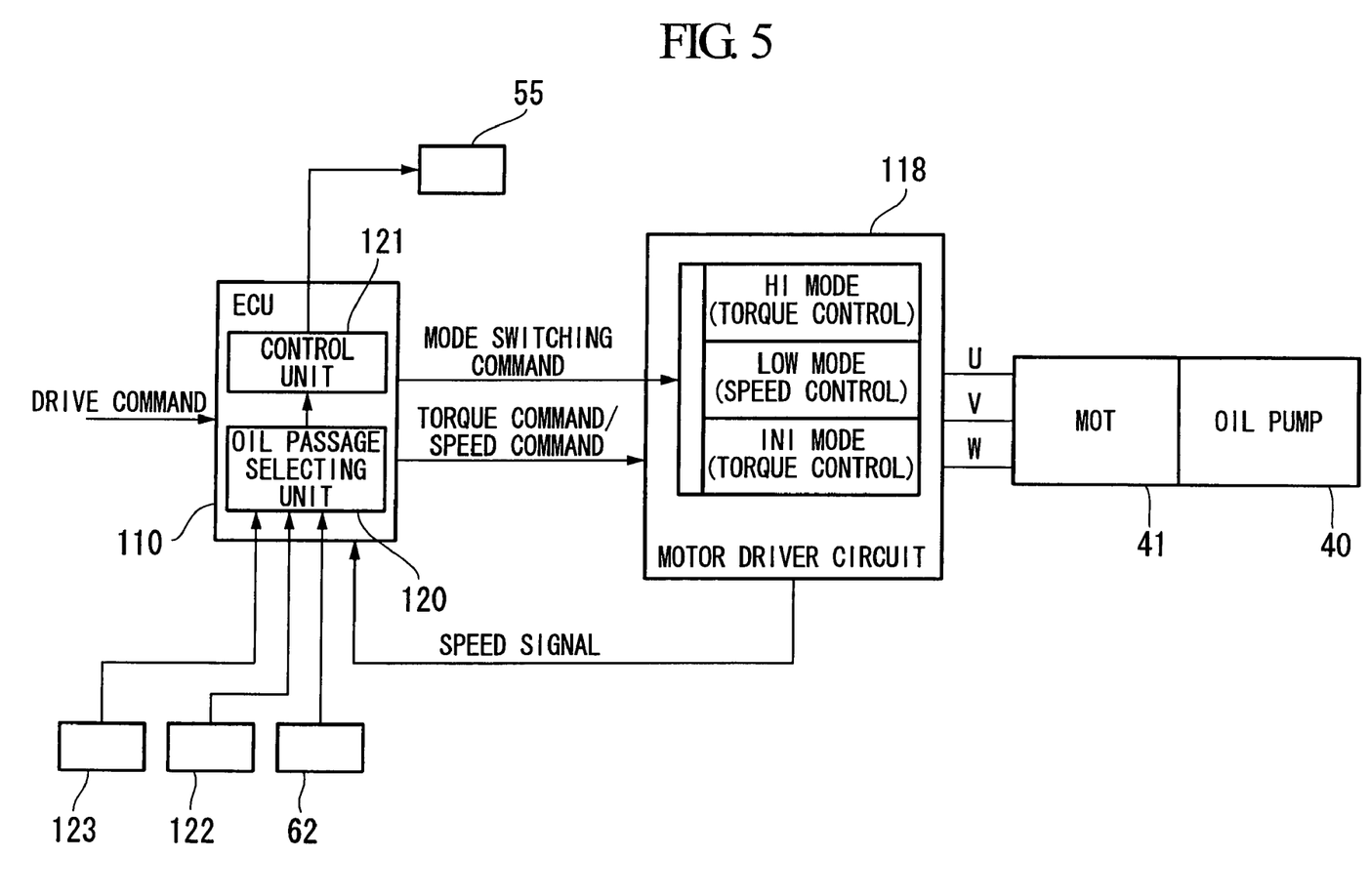
FIG. 5 is a schematic outline view of the control system for the pump driving electric motor of the same embodiment.

The entire constitution of the vehicle shown in FIG. 2 and the drive device 1 shown in FIGS. 3 and 4 shall initially be described. The vehicle 3 shown in FIG. 2 is a hybrid vehicle having a drive unit 6 in which an internal combustion engine 4 and an electric motor 5 are connected in series. The drive power of the drive unit 6 is transmitted to front wheels Wf via a transmission 7, and the drive power of a drive device 1 for auxiliary driving provided separate to the drive unit 6 is transmitted to rear wheels Wr. The drive device 1 is driven by an electric motor 2 (wheel driving electric motor). The electric motor 5 of the drive unit 6 and the electric motor 2 of the rear wheel Wr-side drive device 1 are connected to a power drive unit (PDU) 8 via a battery 9. Power supply from the battery 9 and energy regeneration from the electric motors 5 and 2 to the battery 9 is performed via the PDU 8.

FIG. 3 shows the entire longitudinal sectional view of the drive device 1, with 10A and 10B in the drawing denoting the left and right axles of the rear wheels of the vehicle. A housing 11 of the drive device 1 is provided so as to cover the periphery from approximately the intermediate position between both axles 10A and 10B to the axle 10B side, being supported and fixed to the bottom of the vehicle 3 as well as to the axle 10B (see FIG. 2). Also, the entire housing 11 is formed to be approximately cylindrical, with the wheel driving electric motor 2, a planetary gear reducer 12 that reduces the rotational speed of the electric motor 2, and a differential 13 that distributes the power of the reducer 12 to the left and right axles 10A and 10B arranged to be coaxially housed therein.

In the present embodiment, the planetary gear reducer 12 and the differential 13 constitute the power transmission device in the drive device 1.

A stator 14 of the electric motor 2 is fixedly disposed to the wheel-side end inner periphery of the housing 11 (right side in FIG. 3). An annular rotor 15 is disposed to be rotatably arranged on the inner periphery side of the stator 14. A cylinder shaft 16 that encloses the outer periphery of the axle 10B is coupled to the inner periphery portion of the rotor 15. This cylinder shaft 16 is supported by an edge wall 17 and an intermediate wall 18 so as to be coaxial with the axle 10B via a shaft bushing 19. Also, a resolver 20 is provided between the outer periphery of one side of the cylinder shaft 16 and the edge wall 17 of the housing 11 to feed back rotation information of the rotor 15 to a controller (not illustrated) for control of the electric motor 2.

The planetary gear reducer 12 is provided with a sun gear 21, a plurality of planetary gears 22 that mesh with the sun gear 21, a planetary carrier 23 that supports the planetary gears 22, and a ring gear 24 that is meshed with the outer periphery of the planetary gears 22. The drive power of the electric motor 2 is input from the sun gear 21, and the reduced drive power is output through the planetary carrier 23.

The sun gear 21 is integrally formed with the outer periphery of a sleeve 25 disposed coaxially with the outer periphery side of the axle 10B. One end side of the sleeve 25 is coupled in an integrally rotatable manner to the cylinder shaft 16 of the electric motor 2 side. Each the planetary gear 22 has a large-diameter first gear 26 that is directly meshed with the sun gear 21 and a second gear 27 with a diameter smaller than that of the first gear 26. Each first gear 26 and each second gear 27 are integrally formed coaxially and in a state of being offset in the axial direction. The ring gear 24 is rotatably disposed in a side position of the first gear 26 in the axial direction, with its inner periphery side meshed with the small-diameter second gear 27. The ring gear 24 is held in an integrally rotatable manner by a rotating drum 29 of a hydraulic clutch 28 that is described below, and rotatably supported in the housing 11 via this rotating drum 29.

The differential 13 is provided with a differential case 31 in which a rotatable pinion 30 is installed in a protruding manner in the interior, and a pair of side gears 32a and 32b that mesh with the pinion 30 in the differential case 31. These side gears 32a and 32b are separately coupled to the left and right axles 10A and 10B. On the outer surface of the differential case 31, the planetary carrier 23 of the planetary gear reducer 12 is integrally provided in an extending manner. The differential case 31 is supported by an edge wall 34 at the chassis center side of the housing 11 and the intermediate wall 18 via a bushing 33.

A cylindrical space is secured between the ring gear 24 and the edge wall 34 in the housing 11, and the hydraulic clutch 28 is disposed in that space. In the hydraulic clutch 28, a plurality of fixed plates 35 that are spline fitted to the inner periphery surface of the housing 11 and a plurality of rotating plates 36 that are spline fitted to the outer periphery surface of one end of the rotating drum 29 are alternately arranged in the axial direction. Pressure contact and release of the fixed plates 35 and the rotating plates 36 are operated by an annular piston 37. The piston 37 is housed to freely advance and retract in the annular cylinder chamber 38 formed at the edge wall 34 of the housing 11. Feeding high-pressure oil into the cylinder chamber causes the piston 37 to advance, and discharging oil from the cylinder chamber 38 causes the piston 37 to retract. The hydraulic clutch 28 is connected to a hydraulic circuit 39 shown in FIG. 1, with this hydraulic circuit to be described in detail later.

In this hydraulic clutch 28, the fixed plates 35 lock rotation in the housing 11, and the rotating plates 36 integrally support the ring gear 24. As a result, when both the fixed plates 35 and the rotating plates 36 are pressure contacted by the piston 37, braking force is applied to the ring gear 24 by the friction engagement between the plates 35 and 36. When the pressure contact by the piston 37 is released, free rotation of the ring gear 24 is again permitted.

On the exterior of the wheel-side edge wall 17 of the housing 11, an oil pump 40 for supplying oil to the hydraulic clutch 28, the cooling portion of the electric motor 2, and the lubricating portion (of the power transmission device) in the housing 11; a pump driving electric motor 41 for driving the oil pump 40; and an accumulator 42 that accumulates oil in a pressure-accumulated state at the stage prior to supplying it to the hydraulic clutch 28 are provided as shown in FIGS. 3 and 4. These are housed in a cover 43 as block-shaped and fixed along with the cover 43 to the edge wall 17.

The pump driving electric motor 41 is a brushless motor that has an annular rotor 44 as shown close-up in FIG. 4. An annular stator 45 that is a size larger than the rotor 44 is fixed to the outer surface of the edge wall 17 via a bracket 46. A sleeve 47 that is fixed to the inner periphery of the rotor 44 is supported by the edge wall 17 and the bracket 46 via a bushing 48. The rotor 44 and the stator 45 in this state are coaxially disposed on the outer periphery side of the axle 10B.

The oil pump 40 is an external gear pump, with a pair of gears 49 for pump operation disposed in parallel alignment on the outer periphery of the pump driving electric motor 41. Rotation of the electric motor 41 is transmitted to one of the gears 49 of the oil pump 40 by a gear transmission mechanism 50.

In the accumulator 42, an annular chamber 51 that has depth in the axial direction is integrally formed along the edge of the inner periphery of the cover 43. An annular piston 52 is housed to freely advance and retract in the annular chamber 51, with the piston 52 biased by a spring 53 for accumulating pressure.

When driving the axles 10A and 10B on the rear wheel Wr side with the drive device 1 of the above constitution, by supplying the oil pressure of the oil pump 40 to the hydraulic clutch 28, the clutch 28 is turned ON, and by effecting friction engagement of the fixed plates 35 and the rotating plates 36, the ring gear 24 becomes fixed with respect to the housing 11. When the ring gear 24 is thus fixed, the reducing ratio of the planetary gear reducer 12 is fixed, with drive power transmitted without loss between the sun gear 21 and the planetary carrier 23. Accordingly, the drive power of the electric motor 2 at this time is lowered to the set reducing ratio by the planetary gear reducer 12, and transmitted to the left and right axles 10A and 10B of the vehicle by means of the differential 13.

When the rotation speed of the rear wheels Wr exceeds the rotation speed of the electric motor 2 such as when driving by the drive device 1 on a downslope and the like, by discharging the oil in the hydraulic clutch 28, the clutch 28 is turned OFF, whereby braking of the ring gear 24 is released. When the ring gear 24 is thus free to rotate, the ring gear 24 rotates idly in the housing 11 in tandem with the rotation of the axles 10A and 10B, and as a result, the rotor 15 of the electric motor 2 is no longer forcibly rotated by the rotation force of the axles 10A and 10B.

Accordingly, the drive device 1 can prevent excess rotation of the electric motor 2 and generation of axle friction.

The hydraulic circuit 39 shown in FIG. 1 shall now be described. The hydraulic circuit control device according to the present invention is implemented to the control system of this hydraulic circuit 39.

In the hydraulic circuit 39, oil discharged from the oil pump 40 is selectively switched to a clutch oil passage 58 and a low-pressure oil passage 57 through a pilot-operating valve 55, which is a solenoid valve, and a selector valve 56. The low-pressure oil passage 57 is continuous with a suitable position in the housing 11 for supplying oil to the cooling portion of the electric motor 2 and lubricating portions of the power transmission device such as the planetary gear reducer 12 and the differential 13. A check valve 61 is set between the clutch oil passage 58 and the selector valve 56 to prevent reverse flow of oil from the clutch oil passage 58 to the selector valve 56. A clutch operating valve 59 that consists of a solenoid valve is set in the clutch oil passage 58, and a branched oil passage 60 that leads to the accumulator 42 is provided further upstream from than the clutch operating valve 59. A pressure sensor 62 that monitors the pressure in the accumulator 42 is provided in the branched oil passage 60, with detection signals from the pressure sensor 62 being fed to a controller 110 (ECU). The clutch oil passage 58 is an oil passage that requires a high pressure in order to engage and disengage the hydraulic clutch 28, and so constitutes a first oil passage in the present invention. In addition, the low-pressure oil passage 57 is an oil passage that requires a low-pressure and high flow rate for cooling and lubrication purposes, and so constitutes a second oil passage in the present invention.

The pilot-operating valve 55 and the selector valve 56 in the hydraulic circuit 39 constitute an oil passage switching unit in the present invention.

Figure 1:
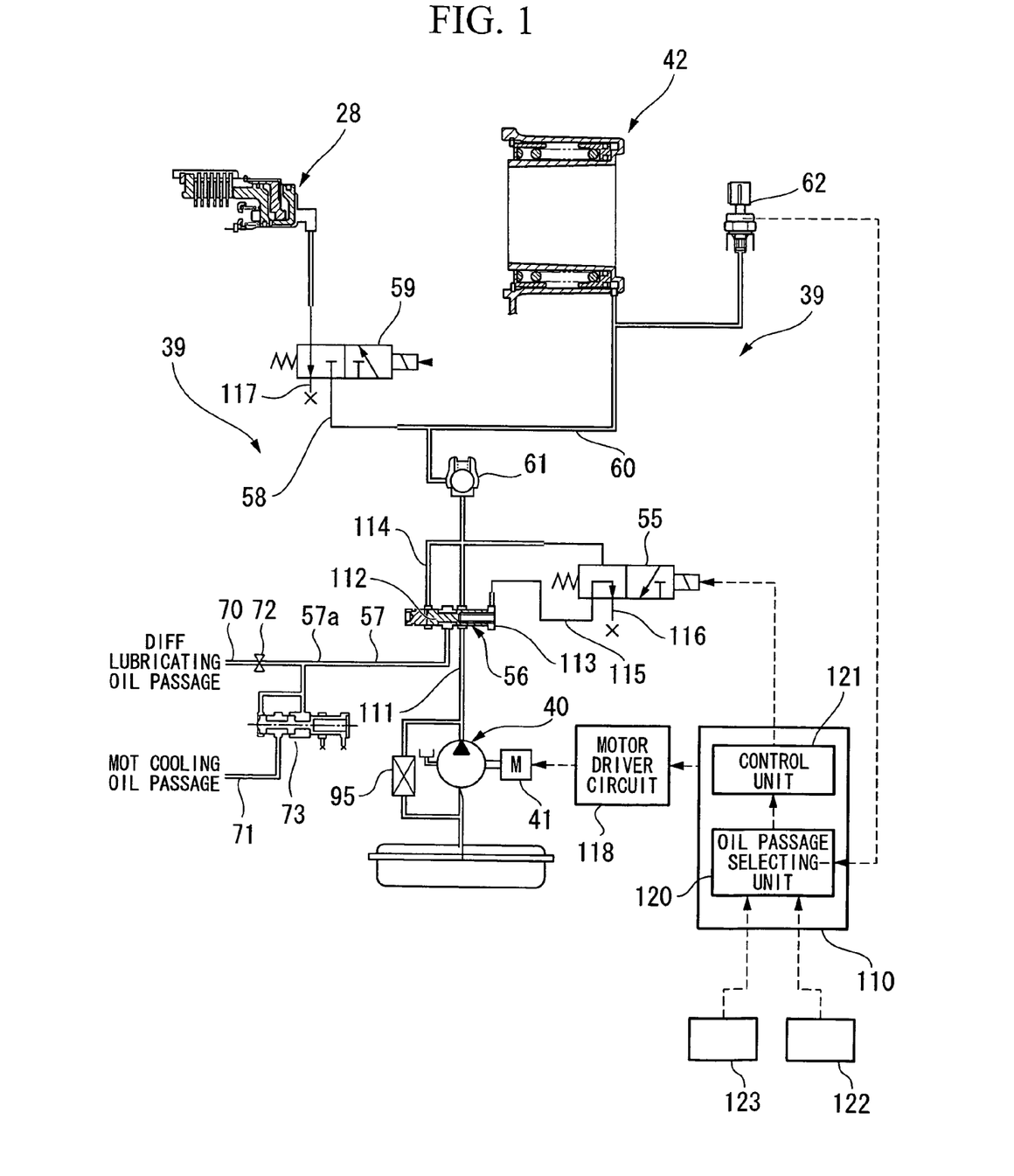
FIG. 1 is a schematic outline view of the control system for the oil pump hydraulic circuit and the pump driving electric motor including the embodiment of the present invention.

The selector valve 56 is provided with a spool 112 that allows or blocks communication of a pump oil passage 111, which connects the oil pump 40 and the check valve 61, with respect to the low-pressure oil passage 57, and a spring 113 that biases the spool 112 to the left in FIG. 1. The pressure of the pump oil passage 111 always acts on the end face of the spool 112 on the left side in FIG. 1 via a back-pressure passage 114, while the operating pressure produced by the pilot-operating valve 55 acts on the right-side end face of the spool 112 via a pilot passage 115.

The pilot-operating valve 55 is a solenoid three-way valve that is controlled by the controller 110. When power is supplied to the solenoid (i.e., when it is ON), the pump oil passage 111 is connected to the pilot passage 115, which causes pressure of the pump oil passage 111 to act on the right-side end face of the spool 112 in FIG. 1. At this time, since the same pressure acts on the end faces of both sides of the spool 112, the spool 112 moves to the left side in the drawing due to the force of the spring 113. Thereby, the low-pressure oil passage 57 is cut off, so that the pump oil passage 111 is only connected to the clutch oil passage 58. Also, when power is cut to the solenoid of the pilot-operating valve 55 (i.e., when it is OFF), simultaneously with cutting the connection between the pump oil passage 111 and the pilot passage 115, the pilot passage 115 becomes connected to a drain port 116, whereby the pressure acting on the right-side end face of the spool 112 is opened. At this time, the spool 112 moves to the right side due to the pressure of the pump oil passage 111 acting on the left-side end face of the spool 112, making the pump oil passage 111 continuous with the low-pressure oil passage 57.

Accordingly, connection of the clutch oil passage 58 and the low-pressure oil passage 57 to the oil pump 40 is controlled by ON/OFF operation of the pilot-operating valve 55.

The clutch operating valve 59 is a solenoid three-way valve that is controlled by the controller 110 similarly to the pilot-operating valve 55. When power is supplied to the solenoid, the branched oil passage 60 that leads to the accumulator 42 is connected to the hydraulic clutch 28 and the hydraulic clutch 28 is engaged. When power is cut to the solenoid, the connection of the hydraulic clutch 28 with the branched oil passage 60 side is cut off, and the hydraulic clutch 28 becomes connected to a drain port 117, whereby engagement of the hydraulic clutch 28 is released.

Also, the pump driving electric motor 41 that drives the oil pump 40 receives power from the battery 9 (see FIG. 2) via the PDU 8 (see FIG. 2), and is drive-controlled by the controller 110 via a motor driver circuit 118.

The controller 110 commences driving of the pump driving electric motor 41 upon receiving a command from a main controller of the vehicle that is not illustrated. It controls the pilot-operating valve 55 and the pump driving electric motor 41 so that the pressure Poil in the accumulator 42 is maintained within a definite pressure range (AL≦Poil≦AH) in which engagement and disengagement of the hydraulic clutch 28 is possible. Three operation modes for the pump driving electric motor 41, namely, Hi mode, Low mode, and Ini mode, are provided in a motor driver circuit 118, with the mode changed in accordance with a mode switching command received from the controller 110.

Each operation mode shall now be described in detail. The Hi mode is the mode used for when operating the oil pump 40 with a high pressure and low flow rate under normal driving conditions. The pump driving electric motor 41 is controlled by setting a torque value as the target value based on a current command issued from the controller 110 (torque control mode).

The Low mode is the mode used for when operating the oil pump 40 with a low pressure and high flow rate under normal driving conditions. The pump driving electric motor 41 is controlled by setting a speed value as the target value based on a rotation speed command issued from the controller 110 (speed control mode).

The Ini mode is the mode used for when operating the oil pump 40 with a greater current than during the Hi mode directly after starting the pump driving electric motor 41. The pump driving electric motor 41 is torque controlled based on a current command issued from the controller 110.

Accordingly, the controller 110 and the motor driver circuit 118 perform control of the pump driving electric motor 41 via torque control in the Hi mode or the Ini mode, and via speed control in the Low mode.

The controller 110 is provided with an oil passage selecting unit 120 that selects whether to supply oil discharged from the oil pump 40 to the clutch oil passage 58 or the low-pressure oil passage 57; and a control unit 121 that controls the ON/OFF of the pilot-operating valve 55 and the control mode switching for the pump driving electric motor 41 in accordance with the selection result of the oil passage selecting unit 120. In this embodiment, the oil passage selecting unit 120 receives a pressure signal from the pressure sensor 62 in the branched oil passage 60 and, based on that signal, selects an oil passage that supplies oil.

Specifically, the controller 110 constantly monitors the pressure Poil in the accumulator 42 via the signal from the pressure sensor 62. The oil passage selecting unit 120 selects the clutch oil passage 58 when the pressure Poil is under the lower limit pressure AL and selects the low-pressure oil passage 57 when the pressure Poil exceeds the upper limit pressure AH. When the oil passage selecting unit 120 has selected the clutch oil passage 58, the pilot-operating valve 55 is turned ON, the pump oil passage 111 is connected to only the clutch oil passage 58, and the control mode of the pump driving electric motor 41 is switched to the Hi mode, which is the torque-control mode. When the oil passage selecting unit 120 has selected the low-pressure oil passage 57, the pilot-operating valve 55 is turned OFF, the pump oil passage 111 is connected to the low-pressure oil passage 57 and the control mode of the pump driving electric motor 41 is switched to the Low mode, which is the speed-control mode.

A speed sensor 122 and an oil temperature sensor 123 are connected to the input side of the controller 110. In the state of the control mode being set to the Low mode, and the hydraulic clutch 28 having stopped power transmission (that is, when in two-wheel drive mode), the controller 110 determines whether to stop operation of the pump driving electric motor 41 based on output signals from these sensors 122 and 123. Under these conditions, when the vehicle speed is lower than a set vehicle speed V1 and the oil temperature is less than a set temperature T1, the controller 110 stops operation of the pump driving electric motor 41.

Figure 6:
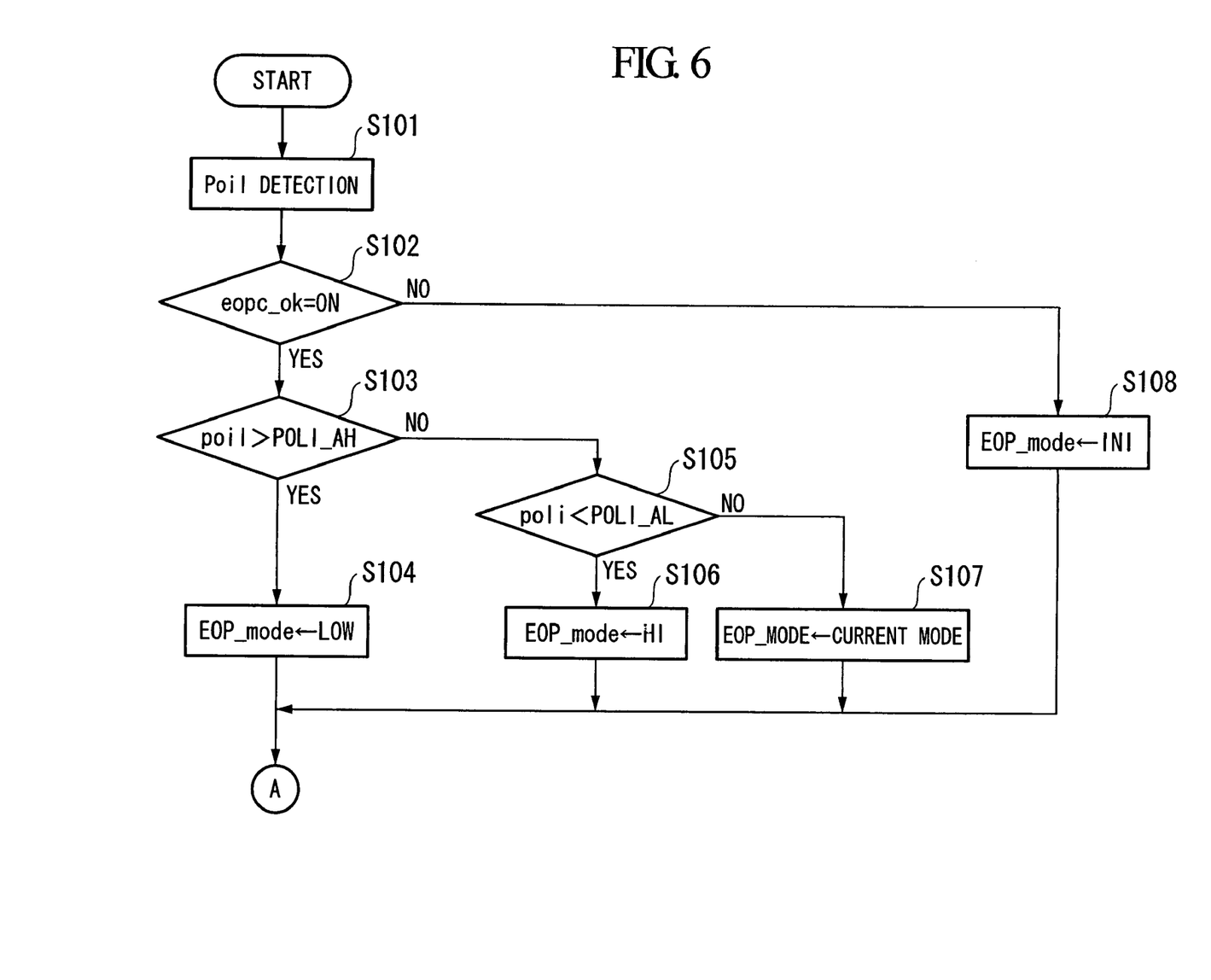
FIG. 6 is a flowchart showing the flow of control of the controller for the same embodiment.
Figure 7:
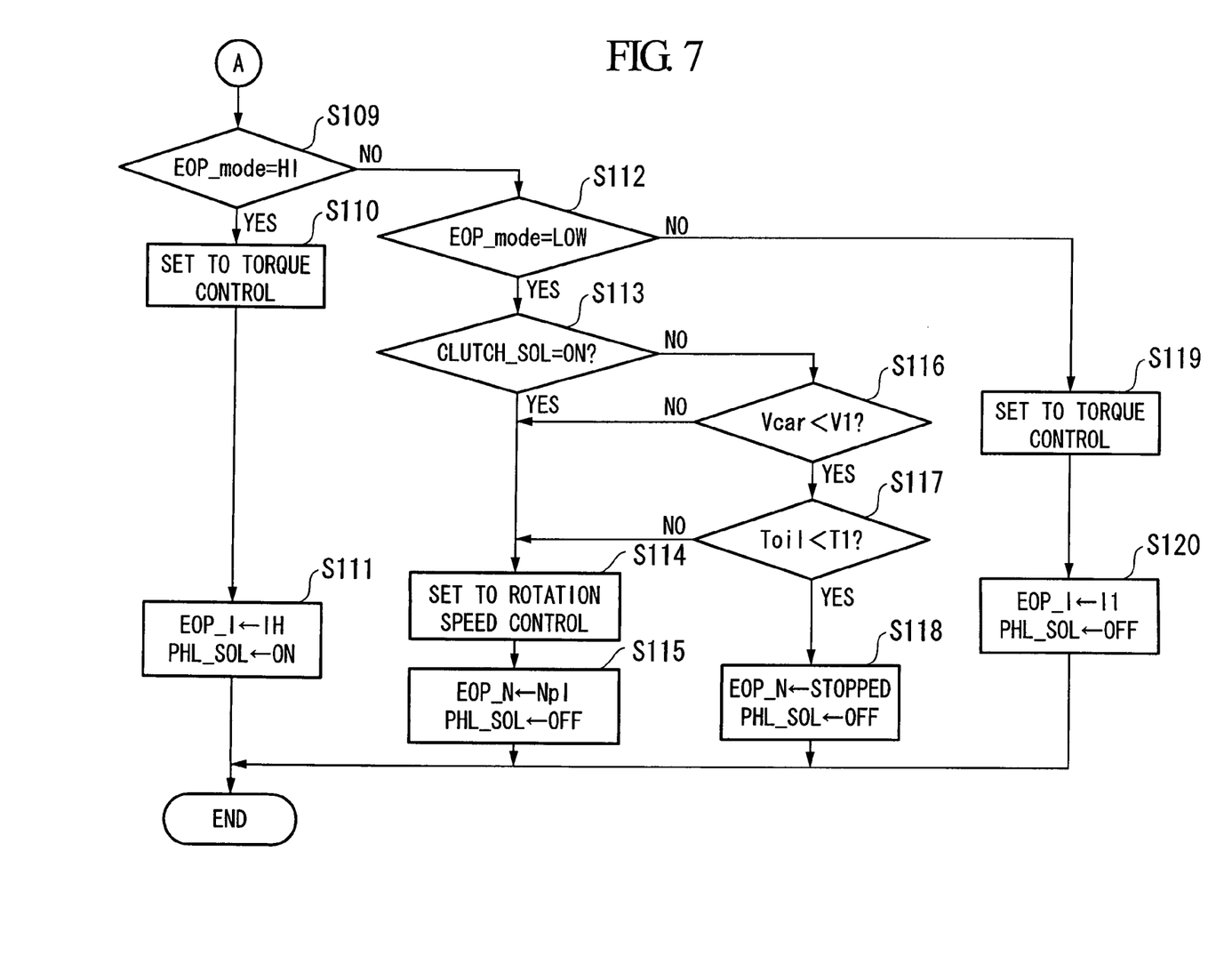
FIG. 7 is a flowchart showing the flow of control of the controller for the same embodiment.

Control performed by the controller 110 shall be described below with reference to the flowcharts in FIGS. 6 and 7.

In step S101, a detection signal is received from the pressure sensor 62, and the pressure Poil of the accumulator 42 is detected. Next, in step S102, it is confirmed that the startup completion signal (the signal that enables the transition to the ordinary control mode) is input from the motor driver circuit 118. When the input of the startup completion signal is confirmed, the processing proceeds to step S103, and when it has not been input, the processing proceeds to step S108, where the operation mode of the pump driving electric motor 41 is set to the Ini mode.

In step S103, it is determined whether the pressure Poil of the accumulator 42 has exceeded the upper limit pressure AH. When it has exceeded the upper limit pressure AH, the processing proceeds to step S104, where the operation mode of the pump driving electric motor 41 is set to the Low mode. When the pressure Poil of the accumulator 42 has not exceeded the upper limit pressure AH, the processing proceeds to step S105, where it is determined whether the pressure Poil of the accumulator 42 is below the lower limit pressure AL. When the pressure Poil is below the lower limit pressure AL, the processing proceeds to step S106, where the operation mode of the pump driving electric motor 41 is set to the Hi mode. When the pressure Poil of the accumulator 42 is not below the lower limit pressure AL, the processing proceeds to step S107, and the operation mode is set to the same mode as the current mode.

When the processing proceeds to any of steps S104, S106, S107, and S108, it always next proceeds to step S109. In the subsequent steps, various different controls are executed in accordance with the operation mode set in the previous state and other vehicle conditions.

In step S109, it is determined whether the set operation mode is the Hi mode. In the case of being the Hi mode, the processing proceeds to step S110, and in the case of not being the Hi mode, the processing proceeds to step S112. In step S110, without regard to whether connection of the hydraulic clutch 28 is performed, since the operation mode is in the Hi mode, which requires the supply of high pressure oil to the accumulator 42, the control of the pump driving electric motor 41 is set to torque control. In step S111, the current command of the pump driving electric motor 41 is set to the current Ih in accordance with the electric motor load pressure, and by turning on the pilot-operating valve 55 the oil emitted from the oil pump 40 is supplied to the clutch oil passage 58 (accumulator 42).

When proceeding from steps S109 to S112, it is determined whether the set operation mode is the Low mode. In the case of the Low mode, the processing proceeds to step S113, and if not the Low mode the processing proceeds to step S119. In the event of proceeding to step S119, since the operation mode is the Ini mode, after the control of the pump driving electric motor 41 is set to torque control, in step S120 the current command of the pump driving electric motor 41 is set to startup current I1 and the pilot-operating valve 55 is turned OFF.

In step S113, it is determined whether the clutch operating valve 59 is ON. If it is ON, the processing proceeds to step S114, and if it is OFF, the processing proceeds to step S116. When the processing proceeds to step S114, since the hydraulic clutch 28 is engaged in the Low mode in the state of the pressure of the accumulator 42 being in the set pressure range, the control of the pump driving electric motor 41 is set to speed control. In step S115, the rotation number command for the pump driving electric motor 41 is set to Np1 and the pilot-operating valve 55 is turned OFF.

When the processing proceeds to step S116 in the state of the clutch operating valve 59 being OFF, it is determined whether the current vehicle speed Vcar is less than a set vehicle speed V1. When equal to or greater than the set vehicle speed V1, the processing proceeds to step S114, similarly to when the hydraulic clutch 28 is engaged, and the control of the pump driving electric motor 41 is set to speed control. Also, when the vehicle speed Vcar is less than the set vehicle speed V1, the processing proceeds to step S117, where it is determined whether the current oil temperature Toil is less than a set oil temperature T1. When the oil temperature Toil at this time is equal to or greater than the set oil temperature T1, the processing proceeds to S114, similarly to when the hydraulic clutch 28 is engaged, and the control of the pump driving electric motor 41 is set to speed control.

When the oil temperature Toil is less than the set oil temperature T1, the processing proceeds to S118, where the pump driving electric motor 41 is turned OFF and the pilot-operating valve 55 is turned OFF. That is, when the processing proceeds to step S118, when in Low mode and the clutch operating valve 59 is OFF, since both the vehicle speed Vcar and the oil temperature Toil are sufficiently low, it is determined that there is no need to supply oil to the clutch oil passage 58 or the low-pressure oil passage 57, and operation of the oil pump 40 is stopped.

Figure 8:
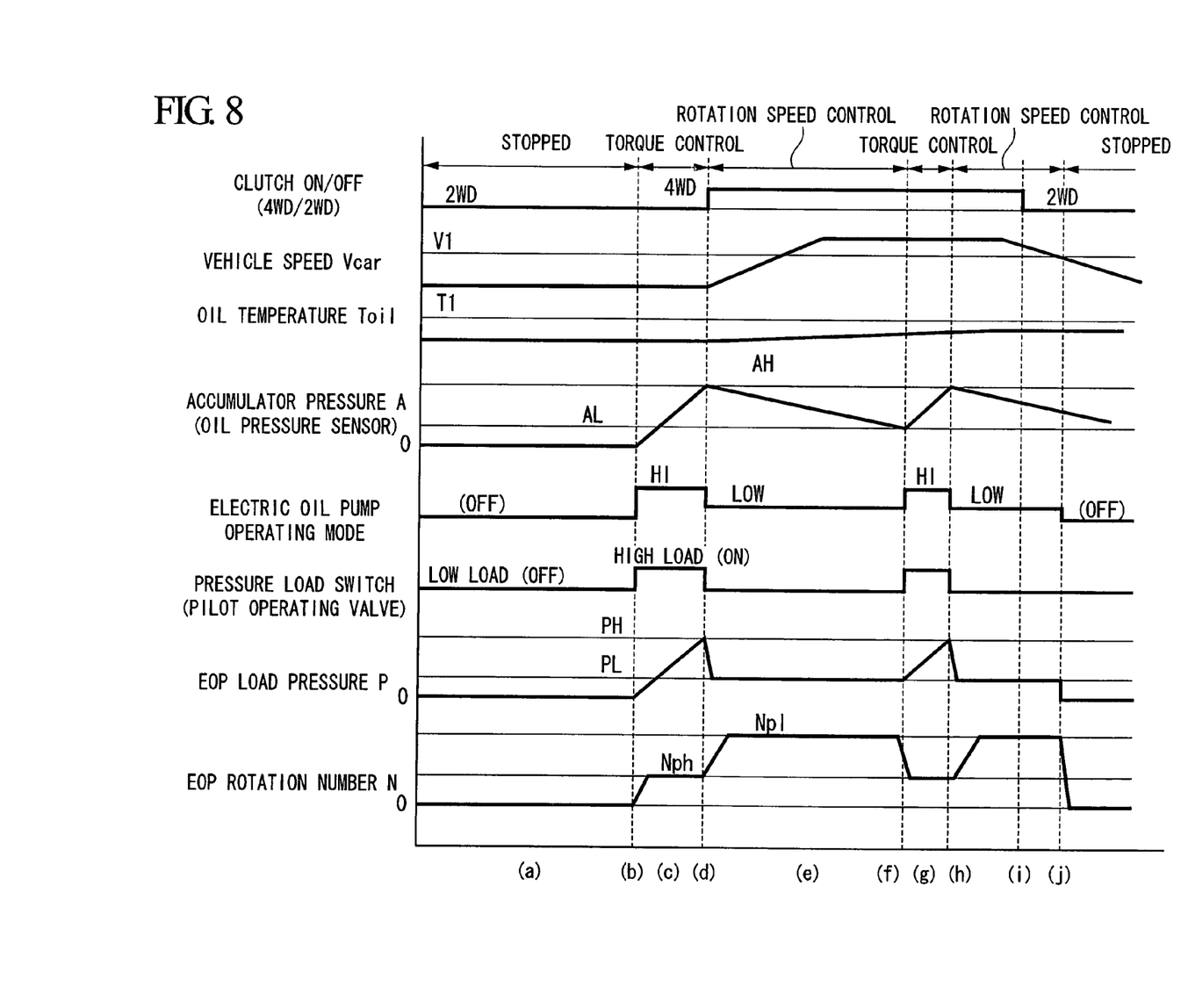
FIG. 8 is a timing chart for the same embodiment.

The flow of control is as described above, but the operation during actual driving is as presented in the timing chart of FIG. 8. This timing chart is explained below.

In FIG. 8, symbol (a) denotes the state of the pump driving electric motor 41 in a stopped condition. When the pressure of the actuator 42 is lower than the lower limit pressure AL at time (b) of startup, the controller 110 instructs a current according to the electric motor (EOP) load pressure PH, and the pump driving electric motor 41 is started by torque control. Then, the pilot-operating valve 55 is turned ON and high-load operation is performed in time period (c) until the pressure of the accumulator 42 reaches the upper limit pressure AH.

At time (d), when the pressure of the accumulator 42 reaches the upper limit pressure AH, by turning off the pilot-operating valve 55, the oil passage connected to the oil pump 40 is switched to the low-pressure oil passage 57 of the low-load side. At this time, the controller 110 instructs the electric motor (EOP) rotation number (Np1), and the pump driving electric motor 41 is operated by rotation speed control. In addition, at time (d), the clutch operating valve 59 is ON and the vehicle switches to four-wheel-drive mode. In time period (e), low-load operation is performed with the pilot-operating valve 55 turned off until the pressure in the accumulator 42 reaches the lower limit pressure AL.

At time (f), when the pressure of the accumulator 42 reaches the lower limit pressure AL, the pilot-operating valve 55 is turned on and the oil passage connected to the oil pump 40 is switched to the clutch oil passage 58 on the high-load side. The controller instructs a current according to the electric motor (EOP) load pressure PH and runs the pump driving electric motor 41 in torque control. From this time on in time period (g), high load operation is performed with the pilot-operation valve 55 turned on until the pressure of the accumulator 42 reaches the upper limit pressure AH.

When the pressure of the accumulator 42 again reaches the upper limit pressure AH at time (h), by turning off the pilot-operation valve 55, the oil passage connected to the oil pump 40 is switched to the low-pressure oil passage 57 similarly to at time (d), and the controller 110 instructs the electric motor (EOP) rotation number (Np1) and runs the pump driving electric motor 41 in rotation speed control.

At time (i), the clutch operating valve 59 switches off, and the vehicle changes to two-wheel-drive mode.

At this time, since the pressure of the accumulator 42 is in a definite range between the lower limit pressure AL and the upper limit pressure AH, the oil temperature Toil is lower than T1, and the vehicle speed Vcar is equal to or greater than V1, the pump driving electric motor 41 maintains its operation condition without stopping. That is, since lubrication of the power transmission device is required with a high vehicle speed Vcar, the running of the pump driving electric motor 41 is continued. At time (j), when the vehicle speed Vcar falls below V1, even if the supply of oil is stopped to the low-pressure oil passage 57, it is determined that there is no lubrication or cooling problem, and the pump driving electric motor 41 is stopped.

Figure 9:
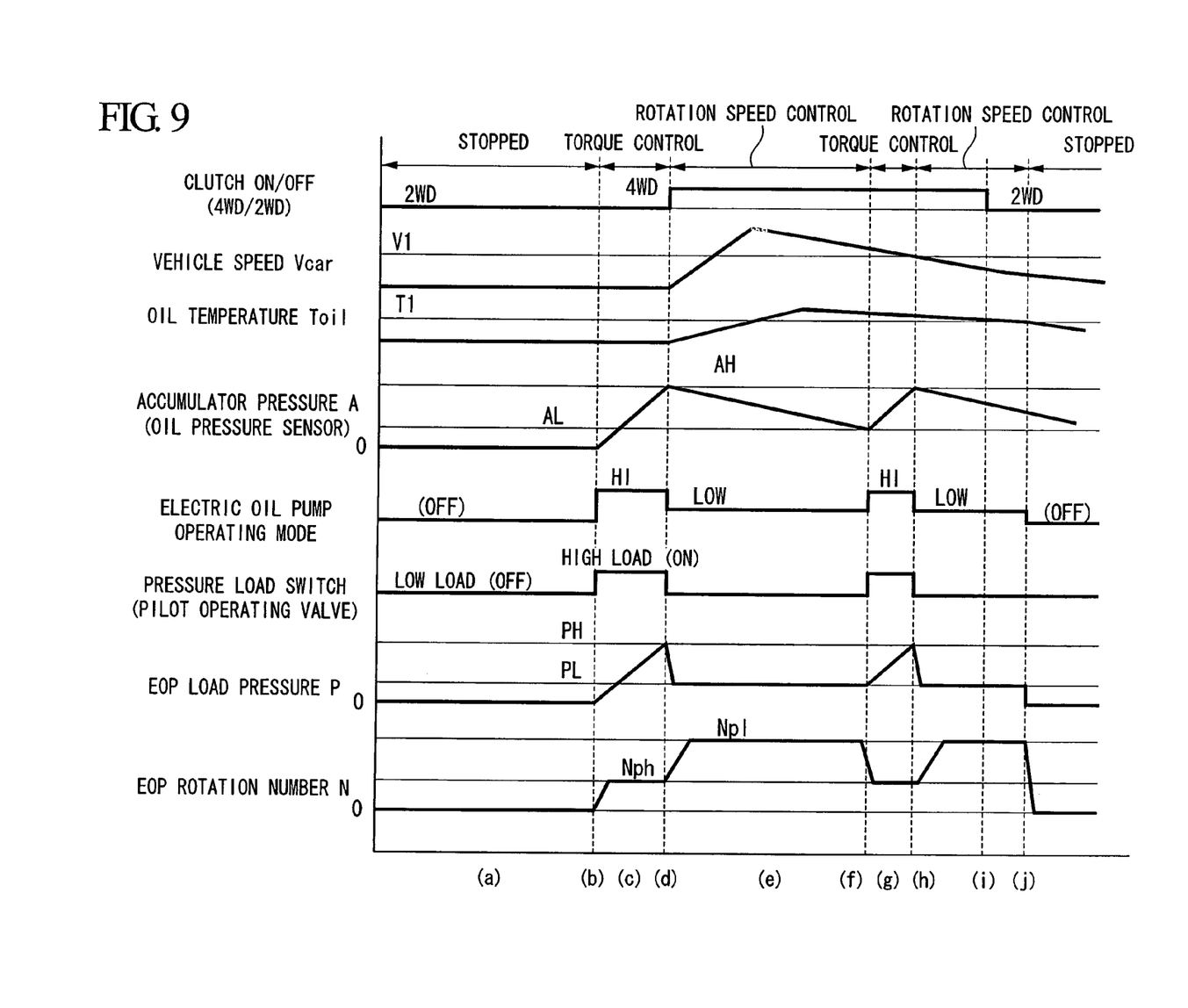
FIG. 9 is a timing chart for a different pattern of the same embodiment.

FIG. 9 shows a timing chart under another driving condition.

The driving condition in the first half of this timing chart resembles that of FIG. 8, but the driving condition of the latter half, particularly from time (i) to time (j), partially differs.

Namely, at time (i), the clutch operating valve 59 is turned off and the vehicle switches to two-wheel-drive mode. The pressure of the accumulator 42 is in a set pressure range between the lower limit pressure AL and the upper limit pressure AH, and the vehicle speed Vcar is slower than V1, but since the oil temperature Toil is equal to or greater than T1, the pump driving electric motor 41 maintains its operating condition without stopping. That is, in this case, since it is necessary to continue cooling of the wheel driving electric motor 2 because the oil temperature Toil is high, running of the pump driving electric motor 41 is continued. When the oil temperature Toil subsequently falls below T1 at time (i), even if the supply of oil is stopped to the low-pressure oil passage 57, it is determined that there is no lubrication or cooling problem, and the pump driving electric motor 41 is stopped.

Next, the low-pressure oil passage 57 of the oil pressure circuit 39 shown in FIG. 1 shall be explained in detail below.

In the low-pressure oil passage 57, the upstream side oil passage 57a connected to the selector valve 56 branches into a lubricating oil passage 70 and a cooling oil passage 71. The lubricating oil passage 70 supplies oil to the lubricating portions of the drive power transmission devices (the planetary gear reducer 12 and the differential 13) as lubricating oil, while the cooling oil passage 71 supplies oil to the cooling portions (the regions requiring cooling) of the wheel driving electric motor 2 as cooling oil. In the lubricating oil passage 70 there is provided an orifice 72, and in the cooling oil passage 71 there is a pressure regulating valve 73 that regulates and relieves the pressure within the low-pressure oil passage 57 in cooperation with the orifice 72.

Figure 10:
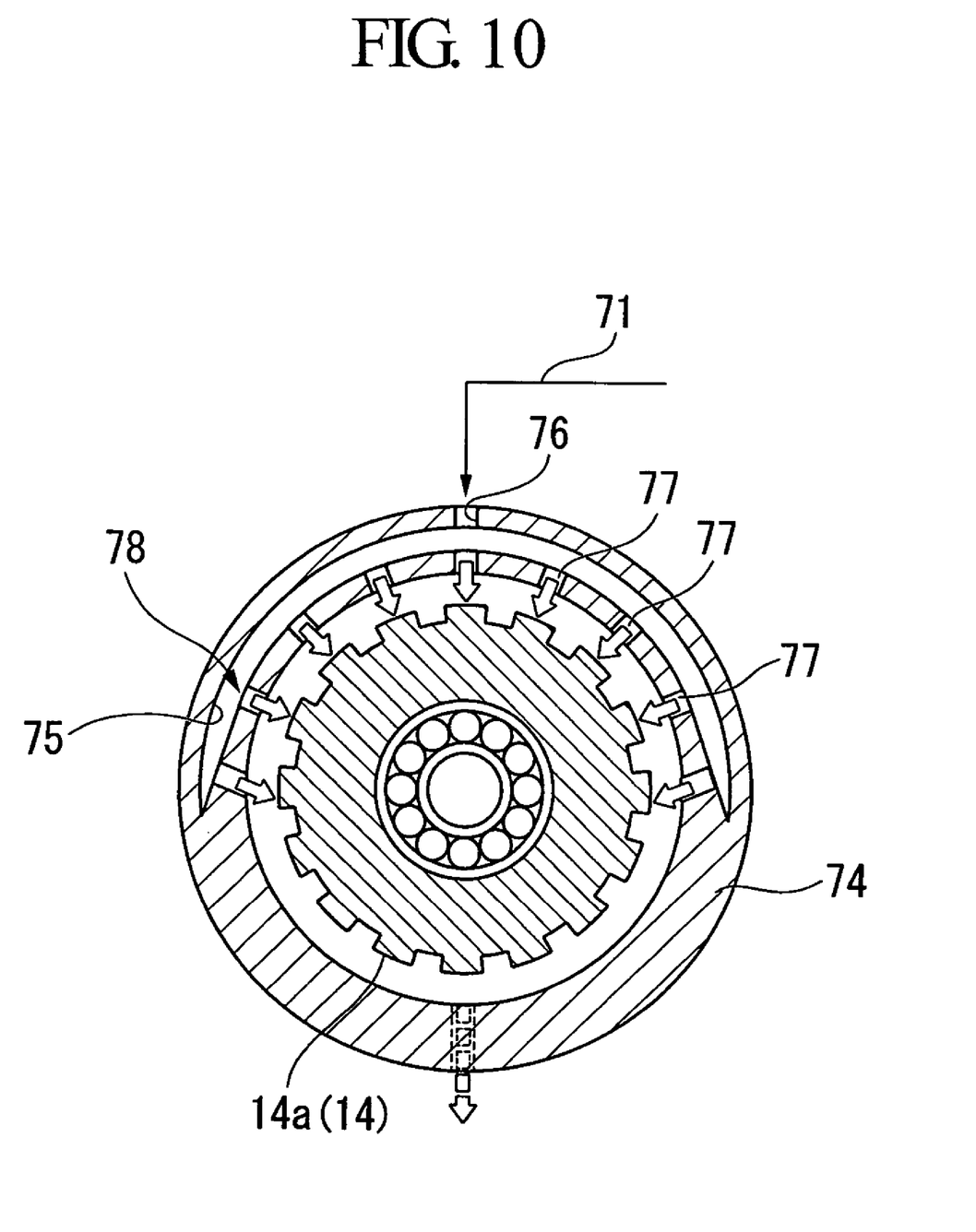
FIG. 10 is a sectional view showing the cooling portion structure of the electric motor of the same embodiment.

The lubricating oil passage 70 opens at a suitable position to be able to supply oil to the planetary gear reducer 12 and the differential 13. The cooling oil passage 71 is connected to a stator cover 74 that encloses a stator coil 14a (coil) of the electric motor 2 as shown in FIG. 10. This stator cover 74 is integrally provided with the housing 11 shown in FIG. 3, with an approximately semicircular oil filling chamber 75 formed in the upper half of the interior. The oil filling chamber 75 is connected to the cooling oil passage 71 via an introduction port 76, and a plurality of small-diameter spray holes 77 are formed on the inner periphery of the oil filling chamber 75 whereby oil can be directly discharged onto the outer surface of the stator coil 14a. The oil filling chamber 75 and the spray holes 77 formed in this stator cover 74 constitute a spray mechanism 78 that directly discharges oil onto the stator coil 14a. Since the diameter of the spray holes 77 is small in the spray mechanism 78, oil is not discharged from the spray holes 77 onto the stator coil 14a until the pressure in the oil filling chamber 75 reaches a specified pressure. At the point when the pressure in the oil filling chamber 75 has risen to or surpassed the specified pressure, oil is discharged onto the stator coil 14a in small droplets.

Figure 11:
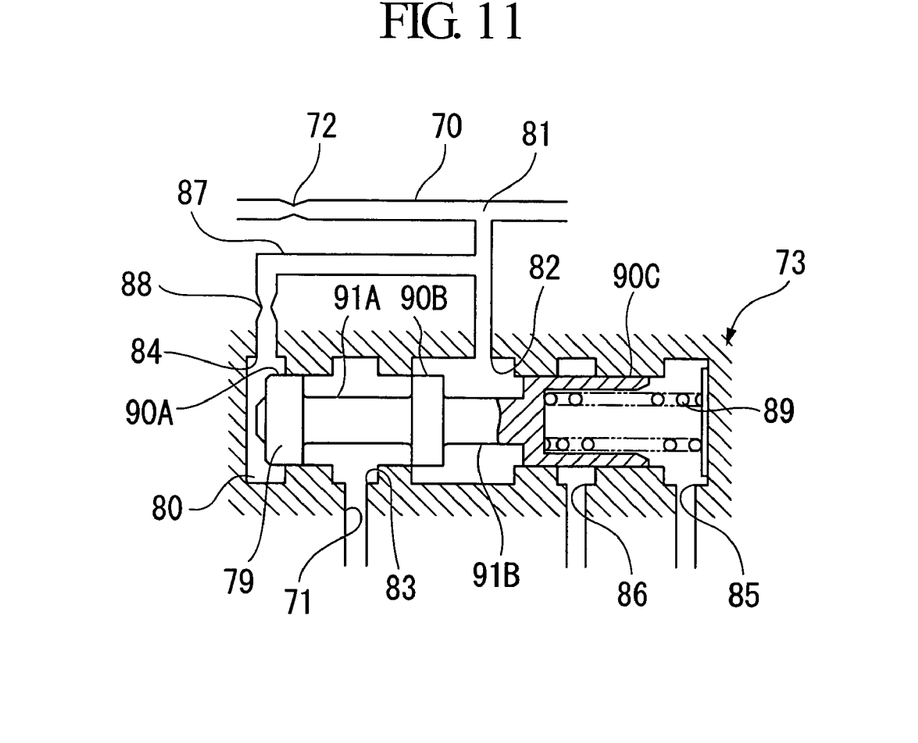
FIG. 11 is a sectional view of the pressure regulating valve of the embodiment during pressure regulating operation.

In the pressure regulating valve 73, a spool 79 that is a valve as shown in FIG. 11 is slidably accommodated in a valve chamber 80. The pressure in the lubricating oil passage 70 is adjusted by displacement of the spool 79 in accordance with pressure on a branched portion 81 of the lubricating oil passage 70 and the cooling oil passage 71, and when the pressure of the branched portion 81 has risen to or above a set pressure, the oil inside is drained.

Specifically, in approximately the center position in the axial direction of the valve chamber 80, an inlet port 82 connected to the branched portion 81 of the cooling oil passage 71 and an outlet port 83 connected to the cooling portion side of the electric motor 2 are offset in the axial direction. An operating pressure port 84 is provided on the end portion of the valve chamber 80 on the outlet port 83 side, and an air port 85 is provided on the other end portion of the valve chamber 80 on the inlet port 82 side, with a drain portion 86 provided between the outlet port 83 and the air port 85. The operating pressure port 84 is connected to the branched portion 81 via a pressure induction passage 87. An orifice 88 for restricting sensitive pressure fluctuations is provided in the pressure induction passage 87. A spring 89 is interposed between the other end portion of the valve chamber 80 and the spool 79, with the spool 79 being constantly biased to the one end side of the valve chamber 80 by the spring 89. A first land portion 90A, a second land portion 90B, and a third land portion 90C are formed spaced apart in the axial direction on the outer periphery of the spool 79 and sandwiching annular grooves 91A and 91B. In an initial state in which the pressure of the branched portion 81 is sufficiently low, as shown in FIG. 11 the first and second land portions 90A and 90B of the spool 79 block communication between the outlet port 83 and the other ports 84 and 82, and the second and third land portions 90B and 90C block communication between the inlet port 82 and the other ports 83 and 84.

When pressure on the branched portion 81 side is introduced to the inlet port 82 and the operating pressure port 84 from the initial state shown in FIG. 11, the thrusts acting on the opposing surfaces of the second land portion 90B and the third land portion 90C, which have the same surface area, cancel each other out. The spool 79 then moves due to the balance of the rightward thrust in FIG. 11 acting on the operating pressure port 84 and the reactive force of the spring 89. In the pressure regulating valve 73, when the pressure on the branched portion 81 side becomes a set pressure (second predetermined pressure), the inlet port 82 and the outlet port 83 mutually communicate due to the displacement of the second land portion 90B, and oil is supplied from the branched portion 81 to the oil filling chamber 75 of the stator cover 74 through the cooling oil passage 71. At this time, the amount of oil supplied to the lubricating oil passage 70 decreases, and the pressure of the lubricating oil passage 70 is restricted to be lower than the second predetermined pressure.

Figure 12:
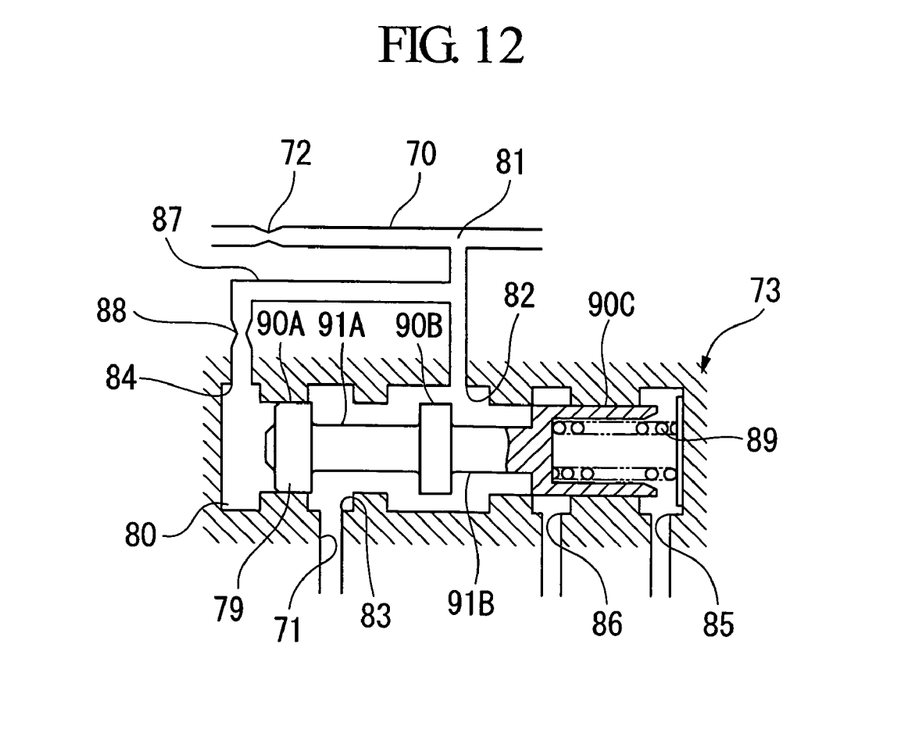
FIG. 12 is a sectional view of the pressure regulating valve of the embodiment during relief operation.

As the temperature decreases the oil viscosity rises, the oil resistance of the cooling oil passage 71 increases. When this occurs, oil is hindered from flowing from the inlet port 82 of the pressure regulating valve 73 to the outlet port 83, and as a result, the pressure in the low-pressure oil passage 57 including the branched portion 81 gradually rises. When the pressure on the branched portion 81 side thus gradually rises, the thrust acting on the spool 79 via the operating pressure port 84 rises. When the pressure on the branched portion 81 side reaches a first predetermined pressure that is higher than the second predetermined pressure, the drain port 86 opens due to the displacement of the third land portion 90C, and oil is discharged from the inlet port 82 to the drain port 86, as shown in FIG. 12. Thereby, the pressure throughout the entire low-pressure oil passage 57 is inhibited from becoming higher than the first predetermined pressure.

In the discharge piping of the oil pump 40, a high-pressure relief valve 95 is provided as shown in FIG. 1, and the pressure of the oil supplied to the clutch oil passage 58 thereby is restricted to a prescribed pressure or less. The second predetermined pressure is a lower pressure than the prescribed pressure of this high-pressure relief valve 95.

As described above, when supplying oil to the clutch oil passage 58 that requires a high pressure, the control device of this hydraulic circuit (the control device that controls the hydraulic circuit 39) controls the pump driving electric motor 41 by torque control. When supplying oil to the low-pressure oil passage 57 that requires a low pressure and high flow rate, the control device of this hydraulic circuit controls the pump driving electric motor 41 by speed control. Therefore, step out of the pump driving electric motor 41 due to large fluctuations in the hydraulic load accompanying operation of the hydraulic clutch 28 can be reliably prevented. Moreover, when sending oil at a low pressure and high flow rate through the low-pressure oil passage 57, excessive power consumption due to overspeed of the pump driving electric motor 41 can be reduced.

The control device of the hydraulic circuit constantly monitors the pressure of the accumulator 42 side of the clutch oil passage 58 with the pressure sensor 62. When the detected pressure in the accumulator 42 deviates from a set pressure range, the oil passage selecting unit 120 selects the clutch oil passage 58. Therefore, it is always possible to achieve oil passage selection in accordance with the request of the clutch oil passage 58 and the optimum electric motor control mode based on that selection.

Moreover, in the control device of the hydraulic circuit, since the pressure regulating valve 73 with a relief function is interposed in the low-pressure oil passage 57 that sends oil for lubrication and cooling, even if the viscosity of oil rises at low temperatures, the spool 79 of the pressure regulating valve 73 can restrict the pressure of the low-pressure oil passage 57 to be less than the first predetermined pressure by opening the drain port 86. Accordingly, in this device, when the pump driving electric motor 41 is running in speed control mode, overloads caused by fluctuations in the oil viscosity have no impact on the pump driving electric motor 41. Therefore, the energy efficiency of the pump driving electric motor 41 can be raised, and step out of the speed-controlled pump driving electric motor 41 due to overloading can be prevented.

Since restricting the rotation speed of the pump to a specified rotation speed is particularly difficult in the case of operating the oil pump 40 by the sensor-less type pump driving electric motor 41 as in the present embodiment, the implementation of the pressure regulating valve 73 of the present invention is effective.

In the control device of this hydraulic circuit, with respect to the low-pressure oil passage 57 that branches into the lubricating oil passage 70 and the cooling oil passage 71, since the orifice 72 is interposed in the lubricating oil passage 70 and the pressure regulating valve 73 is provided in the cooling oil passage 71, the pressure of the oil supplied to the lubricating portion during normal operation can be kept lower than the second predetermined pressure by the pressure regulating valve 73.

Since pressure adjustment of the lubricating oil passage 70 during normal usage and oil relief of the low-pressure oil passage 57 during abnormally high pressure can be performed by the single spool 79 of the pressure regulating valve 73 in the present embodiment, compared to the case of separately providing two types of valves, the manufacturing cost can be reduced and the weight and size of the device can be reduced.

The present invention is not limited to the aforementioned embodiment, and design modifications are possible without departing from the spirit or scope of the present invention. For example, the above embodiment applied the control device according to the present invention to the hydraulic circuit 39 that switches the oil passage for clutch control and the oil passage for cooling/lubrication in the drive device 1 for auxiliary drive use. However, the application of this invention is not limited to the drive device 1, and is applicable to other devices provided they have a hydraulic circuit for switching of an oil passage that requires a high pressure and an oil passage that requires a low pressure and high flow rate.

In the embodiment described above, the oil passage selecting unit 120 in the controller 110 selects the oil passage based on the pressure of the clutch oil passage 58, which is the first oil passage (that is, the pressure of the accumulator 42). However, depending on the application use of the hydraulic circuit, selection of the oil passage may be performed based on the flow rate of the second oil passage that requires a low pressure and high flow rate.

In the embodiment described above, the oil temperature Toil is measured, and the temperature of the wheel driving electric motor 2 is indirectly determined from the oil temperature Toil. However, a temperature sensor may be installed in the wheel driving electric motor 2 to directly measure the temperature of the wheel driving electric motor 2, or the temperature of the wheel driving electric motor 2 may be estimated from the electric current passing through the wheel driving electric motor 2.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A hydraulic circuit control device that selectively supplies oil to a first oil passage that requires a high pressure and a second oil passage that requires a low pressure and high flow rate by an oil pump driven by an electric motor, the control device comprising:
    an oil passage switching unit adapted to connect the oil pump to either the first oil passage or the second oil passage;
    a control mode switching unit adapted to switch the control mode of the electric motor to either a torque control mode or a speed control mode;
    an oil passage selecting unit adapted to select whether to connect the oil pump to the first oil passage or the second oil passage; and
    a control unit adapted to perform control so that the control mode switching unit switches the control mode of the electric motor to the torque control mode when the oil passage selecting unit has selected the first oil passage, and to perform control so that the control mode switching unit switches the control mode of the electric motor to the speed control mode when the oil passage selecting unit has selected the second oil passage.

2. The hydraulic circuit control device according to claim 1, wherein the oil passage selecting unit is adapted to perform oil passage selection based on at least one of a pressure of the first oil passage and a flow rate of the second oil passage.

3. A hydraulic circuit control device mounted in a drive device of a vehicle comprising: wheels; a first electric motor that has a coil and a cooling portion and drives the wheels; a power transmission device that has a lubricating portion and transmits the drive power of the first electric motor to the wheels; and a hydraulic clutch mounted in the power transmission device that performs engagement and disengagement of drive power between the first electric motor and the wheels, the control device comprising:
    a first oil passage that requires a high pressure and is connected to the hydraulic clutch;
    a second oil passage that requires a low pressure and high flow rate and is connected to at least one of the cooling portion and the lubricating portion;
    an oil pump that is driven by a second electric motor and that selectively supplies oil to the first oil passage and the second oil passage;
    an oil passage switching unit adapted to switch the connection of the oil pump to either the first oil passage or the second oil passage;
    a control mode switching unit adapted to switch the control mode of the second electric motor to either a torque control mode or a speed control mode;
    an oil passage selecting unit adapted to select whether to connect the oil pump to either the first oil passage or the second oil passage; and
    a control unit adapted to perform control so that the control mode switching unit switches the control mode of the second electric motor to the torque control mode when the oil passage selecting unit has selected the first oil passage, and to perform control so that the control mode switching unit switches the control mode of the second electric motor to the speed control mode when the oil passage selecting unit has selected the second oil passage.

4. The hydraulic circuit control device according to claim 3, further comprising:
    a drain passage connected to the second oil passage, and
    a relief valve adapted to discharge oil in the second oil passage to the drain passage when a pressure of the second oil passage is equal to or greater than a first predetermined value.

5. The hydraulic circuit control device according to claim 4, wherein
    the second oil passage has an upstream portion and a downstream portion that has a cooling oil passage that connects to the cooling portion and a lubricating oil passage that connects to the lubricating portion, and further comprising:
    an orifice provided in the lubricating oil passage; and
    a pressure regulating valve provided in the cooling oil passage and adapted to make oil flow into the cooling portion when a pressure of the upstream portion is equal to or greater than a second predetermined value.

6. The hydraulic circuit control device according to claim 5, further comprising:
    a spray unit provided in the cooling portion, being adapted to discharge oil introduced through the cooling oil passage onto the coil.

7. The hydraulic circuit control device according to claim 5, wherein the relief valve and the pressure regulating valve are integrally formed.

* * * * *